United States Patent [19]  
Shimose

[11] Patent Number: 5,076,608  
[45] Date of Patent: Dec. 31, 1991

[54] SEAT BELT SYSTEM
[75] Inventor: Yoshifumi Shimose, Yokosuka, Japan
[73] Assignee: Nissan Motor Co., Ltd., Yokohama, Japan
[21] Appl. No.: 548,836
[22] Filed: Jul. 6, 1990
[30] Foreign Application Priority Data Sep. 22, 1989 [JP] Japan .................................. 1-246933

[51] Int. Cl.⁵ ............................................. B60R 22/02
[52] U.S. Cl. .................................. 280/801; 280/807; 297/466; 297/468; 297/476
[58] Field of Search ........................ 180/271, 274, 268; 280/801, 805, 806, 807, 808; 297/464, 466, 468, 474, 478, 479, 480, 483

[56]  References Cited
U.S. PATENT DOCUMENTS 4,359,200 11/1982 Brevard et al. ...................... 297/466  
4,534,441 8/1985 Kamijo et al. ....................... 180/268  
4,685,716 8/1987 Kondo ..................................... 296/63  
4,714,274 12/1987 Nagashima ........................... 280/801  
4,741,556 5/1988 Nagashima ........................... 280/807  
4,839,532 6/1989 Kokuryo et al. .................. 307/10.3

FOREIGN PATENT DOCUMENTS

89/09148 10/1989 World Int. Prop. O. .......... 280/807

Primary Examiner—Kenneth R. Rice  
Assistant Examiner—Tamara L. Finlay  
Attorney, Agent, or Firm—Leydig, Voit & Mayer

[57] ABSTRACT

A seat belt system for use with a seat in a motor vehicle comprises a combination belt including a lap belt part and a shoulder belt part, the lap belt part and the shoulder belt part restraining respectively the lap and shoulder portions of a seat occupant when in use; a first mechanism for applying, upon a vehicle collision, the lap belt part with a certain tension thereby increasing the restraining force of the lap belt part; a thigh belt positioned in front of the lap belt part with respect to the seat, the thigh belt restraining the thigh portion of the seat occupant when in use; and a second mechanism for applying, upon the vehicle collision, the thigh belt with a certain tension thereby increasing the restraining force of the thigh belt.

13 Claims, 8 Drawing Sheets

SEAT BELT SYSTEM

BACKGROUND OF THE INVENTION

1. Field of the Invention

The present invention relates in general to a safety system installed in a wheeled motor vehicle, and more particularly, to a seat belt system for restraining a seat occupant in the motor vehicle.

2. Description of the Prior Art

In order to clarify the task of the present invention, one conventional seat belt system, which is disclosed in Japanese Utility Model First Provisional Publication No. 1-89256, will be described with reference to FIGS. 10 and 11.

As is shown in FIG. 10, the seat belt system is applied to a front seat 11 of a motor vehicle. The seat belt system comprises generally a lap-shoulder combination belt system 12 and a thigh belt system 31, which functions to safely restrain a seat occupant in an emergency such as a vehicle collision or the like.

The lap-shoulder combination belt system 12 includes a belt 13 which has a shoulder belt part 13a and a lap belt part 13b. In fact, the shoulder belt part 13a and the lap belt part 13b are bounded by a through ring 33 through which the belt 13 passes. The through ring 33 has a tongue which is latchingly engageable with a buckle member mounted at an inboard portion of a vehicle floor. An upper end of the shoulder belt part 13a has an anchor plate 7 fixed to a center pillar 9 of the vehicle, and a lower end portion of the lap belt part 13b is retracted by an emergency locking type belt retractor 32 arranged beside the seat 11.

The thigh belt system 31 comprises a belt 34 which has one end portion retracted by the belt retractor 32 and the other end fixed to the through ring 33. Two belt supporters 35a and 35b are located at both sides of the seat 11 for suspending the thigh belt 31.

When in use, the through ring 33 is engaged with the buckle member and, as is seen from FIG. 11, the thigh belt 34 is hitched round the belt supporters 35a and 35b having a major portion thereof tightly put on the thighs of the seat occupant "P".

Due to its inherent construction, the seat belt system has the following characteristics.

First, for the seat occupant "P", it is troublesome to manually hitch the thigh belt 34 round the belt supporters 35a and 35b.

Second, in a vehicle collision, belt slippage tends to occur. That is, upon a vehicle collision, the seat occupant "P" is moved forward causing instant locking of the retractor 32 and thus the upper half of the seat occupant "P" is inclined forward. The forward but slight inclination of the upper half of the seat occupant "P" applies the lap belt part 13b with a considerable tension "$T_1$" leaving the thigh belt 34 unchanged or non-tensioned. This phenomenon brings about a considerable moment "M" produced about the center "G" of the hip of the seat occupant "P", which moment is represented by the following equation:

$$M = (T_1 \times l_1) - (F \times l_3) > 0 \qquad (1)$$

wherein:

$T_1$: tension applied to the lap belt part 13b;

$l_1$: distance between the center "G" and the lap belt part 13b;

F: counterforce applied by the seat to the hip of the seat occupant "P";

$l_3$: distance between the center "G" and the lower surface of the hip.

Thus, upon a vehicle collision, the hip of the seat occupant "P" is swung but slightly in a clockwise direction in FIG. 11 causing a slippage of the lap belt part 13b from the originally set restraining position.

SUMMARY OF THE INVENTION

It is therefore an object of the present invention to provide a seat belt system which is free of the above-mentioned drawbacks.

According to the present invention, there is provided a seat belt system for use with a seat in a motor vehicle. The system comprises a combination belt including a lap belt part and a shoulder belt part, the lap belt part and the shoulder belt part restraining respectively the lap and shoulder portions of a seat occupant when in use; first means for applying, upon a given condition, the lap belt part with a certain tension thereby increasing the restraining force of the lap belt part; a thigh belt positioned in front of the lap belt part with respect to the seat, the thigh belt restraining the thigh portion of the seat occupant when in use; and second means for applying, upon the given condition, the thigh belt with a certain tension thereby increasing the restraining force of the thigh belt.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
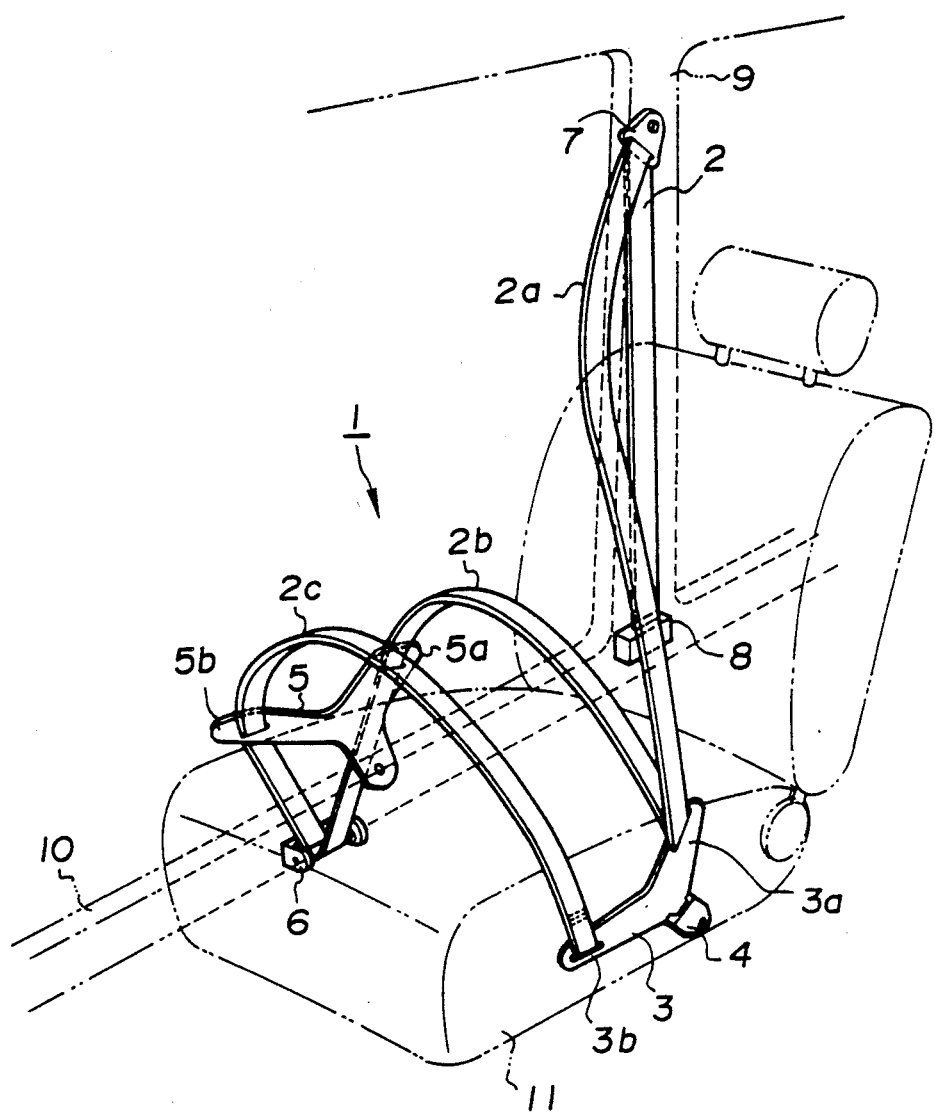
FIG. 1 is a perspective view of a seat belt system of a first embodiment of the present invention.
Figure 2:
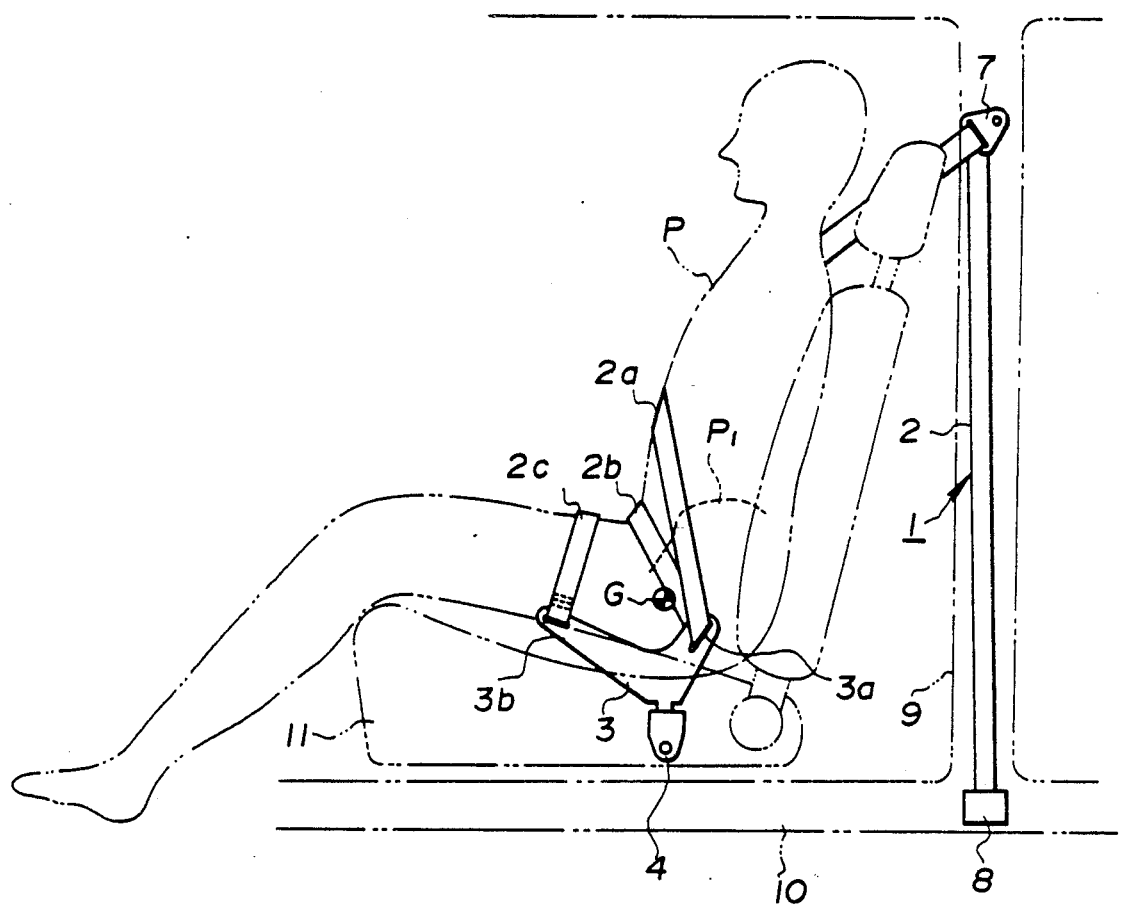
FIG. 2 is a left side view of the seat belt system of the first embodiment in a condition wherein the system is being used by a seat occupant.
Figure 3:
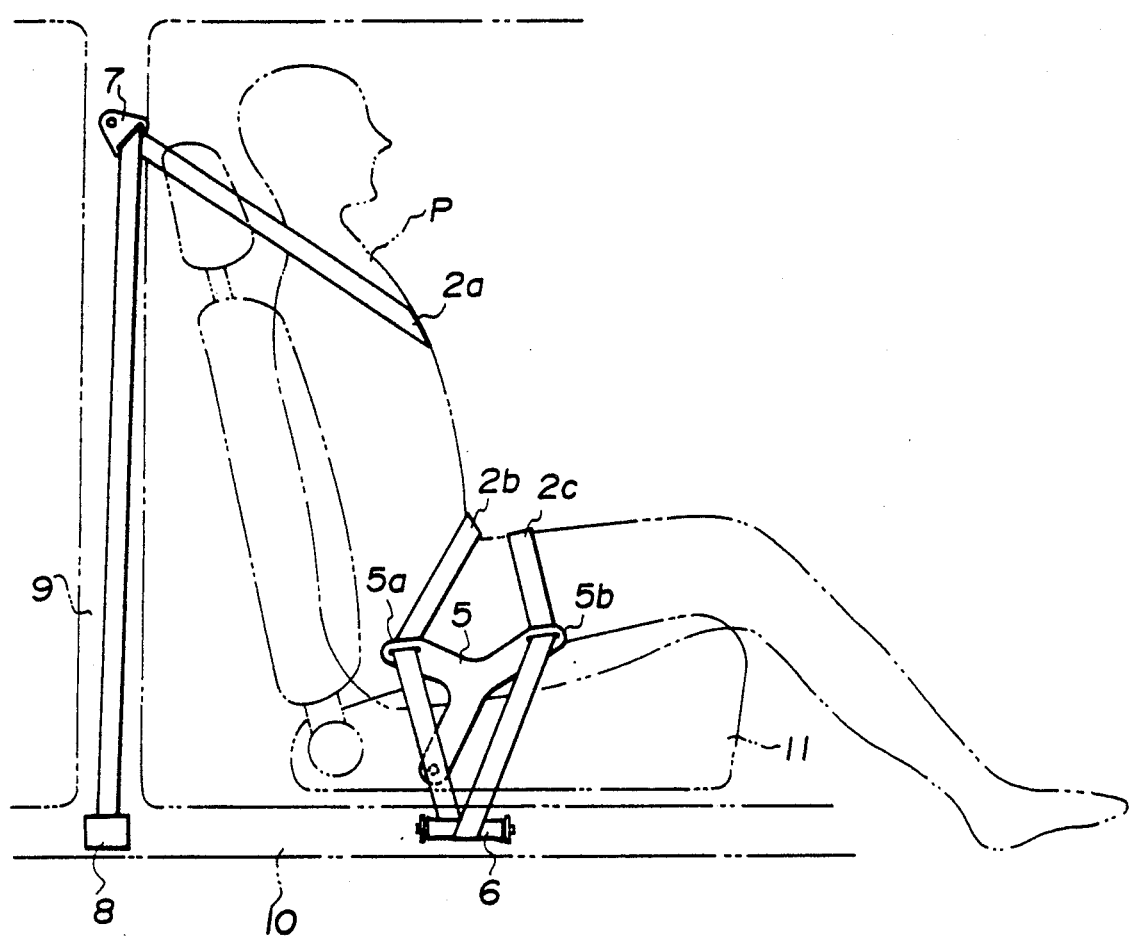
FIG. 3 is a right side view of the seat belt system of the first embodiment.

Referring to FIGS. 1 to 3 of the accompanying drawings, there is shown a seat belt system 1 of a first embodiment of the present invention, which is applied to a front seat 11 of a motor vehicle.

As is best understood from FIG. 1, the system 1 comprises generally a single belt 2, an inner anchor plate 3, a buckle member 4, an outer anchor plate 5, a roller member 6, a shoulder anchor plate 7 and an emergency locking type belt retractor 8.

As is seen, each of the inner anchor plate 3 and the outer anchor plate 5 has a generally Y-shaped structure including a base portion (no numeral), a first arm portion 3a or 5a and a second arm portion 3b or 5b. Each arm portion has a slot for passing the belt 2 therethrough. The base portion of the inner anchor plate 3 is shaped like a tongue which is latchingly engageable with the buckle member 4 which is pivotally connected to an inboard side of the seat 11. While, the base portion of the outer anchor plate 5 is pivotally connected to an outboard side of the seat 11. The roller member 6 is mounted to a side sill 10 of the vehicle, as is seen from FIG. 3.

As is understood from FIG. 1, the belt 2 has one end portion retracted by the belt retractor 8 which is mounted on a lower part of a center pillar 9 of the vehicle. The belt 2 from the retractor 8 is threaded through a slot (no numeral) of the shoulder anchor plate 7 which is pivotally connected to an upper part of the center pillar 9. Although not shown in the drawing, the belt extending between the shoulder anchor plate 7 and the retractor 8 is received in a tunnel formed along the center pillar 9.

The belt 2 is then threaded through the slot of the first arm portion 3a of the inner anchor plate 3, the slot of the first arm portion 5a of the outer anchor plate 5, and then the belt 2 is put around the roller member 6, and then threaded through the slot of the second arm portion 5b of the outer anchor plate 5 and finally tied to the second arm portion 3b of the inner anchor plate 3.

With this belt threading, the belt 2 can have a shoulder belt part 2a which is defined between the shoulder anchor plate 7 and the first arm portion 3a of the inner anchor plate 3, a lap belt part 2b which is defined between the first arm portion 3a of the inner anchor plate 3 and the first arm portion 5a of the outer inner plate 5, and a thigh belt part 2c which is defined between the second arm part 5b of the outer anchor plate 5 and the second arm portion 3b of the inner anchor part 3.

In the following, operation of the seat belt system 1 will be described with reference to FIG. 4.

When, due to a vehicle collision or the like, the seat occupant "P" is forced forward causing instant locking of the retractor 8, the forward but slight inclination of the upper half of the seat occupant "P" pivots the inner and outer anchor plates 3 and 5 forward and, at the same time, applies both the lap belt part 2b and the thigh belt part 2c with considerable tensions "$T_1$" and "$T_2$" respectively. This is because these two parts 2b and 2c are of the single belt 2. This phenomenon brings about a considerable moment "M" produced about the center "G" of the hip of the seat occupant "P", which moment is represented by the following equation:

$$M = (T_1 \times l_1) - (T_2 \times l_2) - (F \times l_3) \quad (2)$$

wherein:

$T_1$: tension applied to the lap belt part 2b;

$l_1$: distance between the center "G" and the lap belt part 2b;

$T_2$: tension applied to the thigh belt part 2c;

$l_2$: distance between the center "G" and the thigh belt part 2c;

F: counterforce applied by the seat to the hip of the seat occupant "P";

$l_3$: distance between the center "G" and the lower surface of the hip.

Since $l_1 < l_2$ and $T_1 \approx T_2$, the moment "M" shows a negative value, that is, $$M < 0 \quad (3)$$

Figure 4:
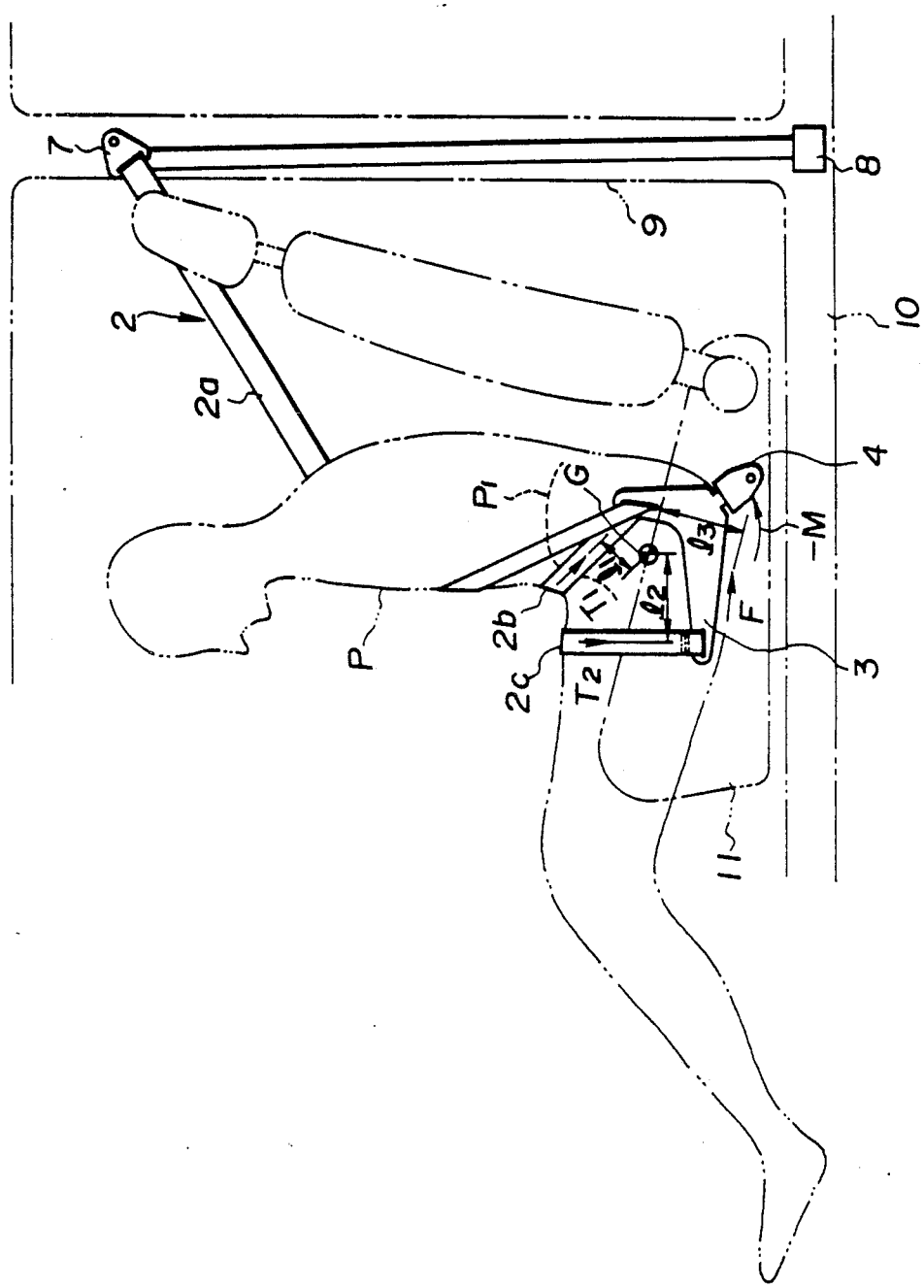
FIG. 4 is a view similar to FIG. 2, but showing a condition wherein a vehicle collision occurs.

Accordingly, the clockwise rotation of the hip portion of the seat occupant "P" in FIG. 4 is suppressed. Thus, the undesired displacement of the lap belt part 2b from the right position "$P_1$" is prevented.

Referring to FIGS. 5 to 9, there is shown a seat belt system 1 of a second embodiment of the present invention.

As will become apparent as the description proceeds, the seat belt system 1 of the second embodiment comprises generally a lap-shoulder combination belt system 12 and a thigh belt system 17, and the tension required by a thigh belt 18 of the thigh belt system 17 is produced by a deformation of an element provided at a front portion of the vehicle.

Figure 5:
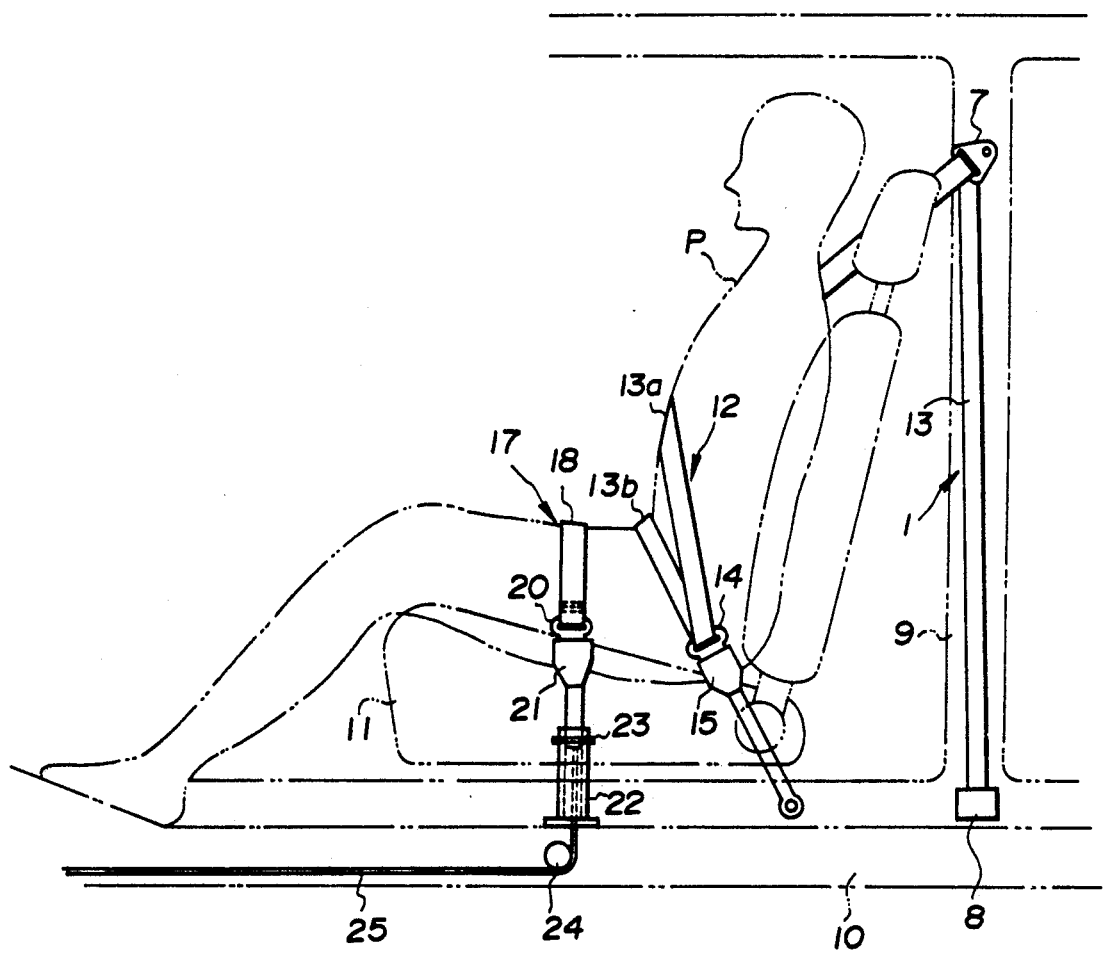
FIG. 5 is a left side view of a seat belt system of a second embodiment of the present invention.
Figure 6:
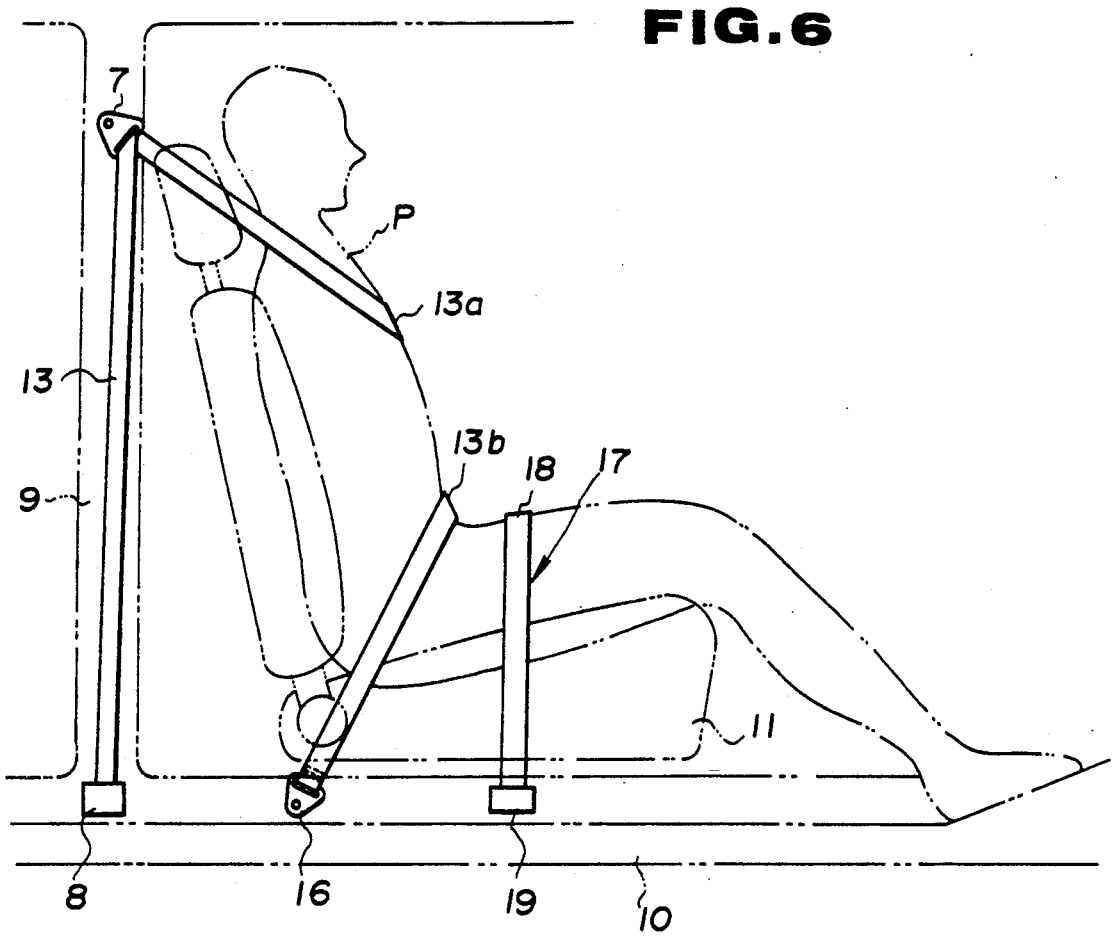
FIG. 6 is a right side view of the seat belt system of the second embodiment.

As is seen from FIGS. 5 and 6, the lap-shoulder combination belt system 12 comprises generally a belt 13, a through ring 14, a buckle member 15, an outer anchor plate 16, a shoulder anchor plate 7 and an emergency locking type belt retractor 8. The buckle member 15 is fixed to a top of a stay (no numeral) which is pivotally connected to an inboard portion of a vehicle floor. The through ring 15 has a tongue which is latchingly engageable with the buckle member 15.

The belt 13 has one end portion retracted by the belt retractor 8 which is mounted on a lower part of the center pillar 9. The belt 13 from the retractor 8 is threaded through the slit of the shoulder anchor plate 7 pivotally connected to an upper part of the center pillar 9. Although not shown in the drawing, the belt extending between the shoulder anchor plate 7 and the retractor 8 is received in a tunnel formed along the center pillar 9.

The belt 13 is then threaded through the through ring 14 and finally tied to the outer anchor plate 16 which is pivotally connected to the side sill 10.

With this belt threading, the belt 13 can have a shoulder belt part 13a which is defined between the shoulder anchor plate 7 and the through ring 14, and a lap belt part 13b which is defined between the through ring 14 and the outer anchor plate 16.

As is seen from FIGS. 5 and 6, the thigh belt system 17 comprises generally a thigh belt 18, an emergency locking type belt retractor 19, a through ring 20, a buckle member 21, a support member 22, a stopper pin 23, a roller member 24, a wire 25, a pivotal link 27 (see FIG. 7), a pivot pin 28 and a push bar 26.

The thigh belt 18 has one end portion retracted by the belt retractor 19 and the other end tied to the through ring 20. The through ring 20 has a tongue which is latchingly engageable with the buckle member 21. The buckle member 21 has an elongate portion which is slidably received in the the support member 22 which is tightly disposed on the vehicle floor. The stopper pin 23 is made of a fragile material, such as plastic or the like, which is passed through aligned bores formed in both the elongate portion of the buckle member 21 and the support member 22. Thus, under a normal condition, the buckle member 21 is connected with the support member 22 without making a relative displacement therebetween. The wire 25 is fixed at one end to the elongate portion of the buckle member 21 and put around the roller member 24 which is located below the support member 22.

Figure 7:
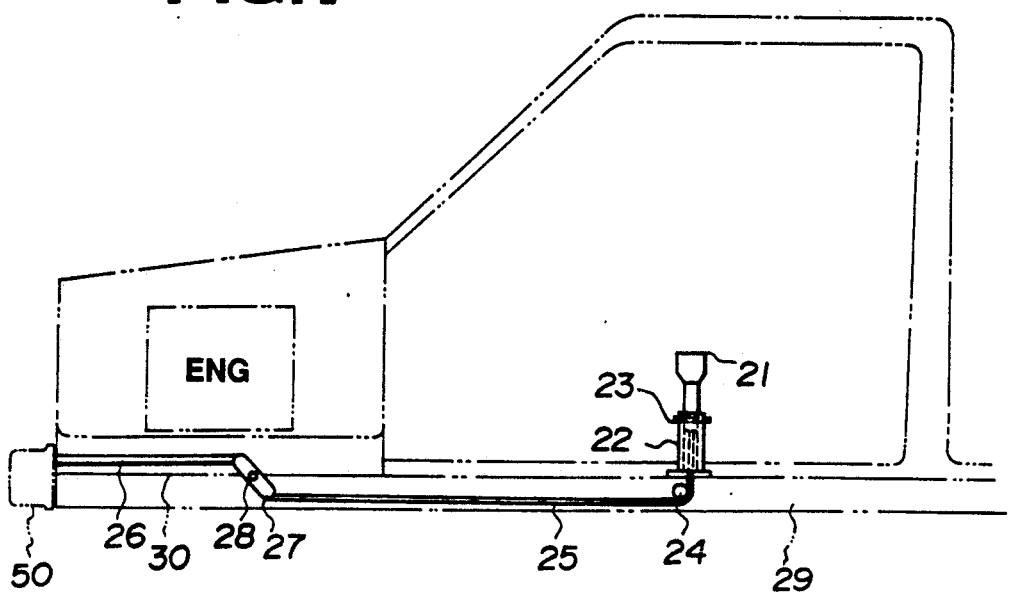
FIG. 7 is a left side view of a motor vehicle, showing an essential mechanism employed in the second embodiment.
Figure 8:
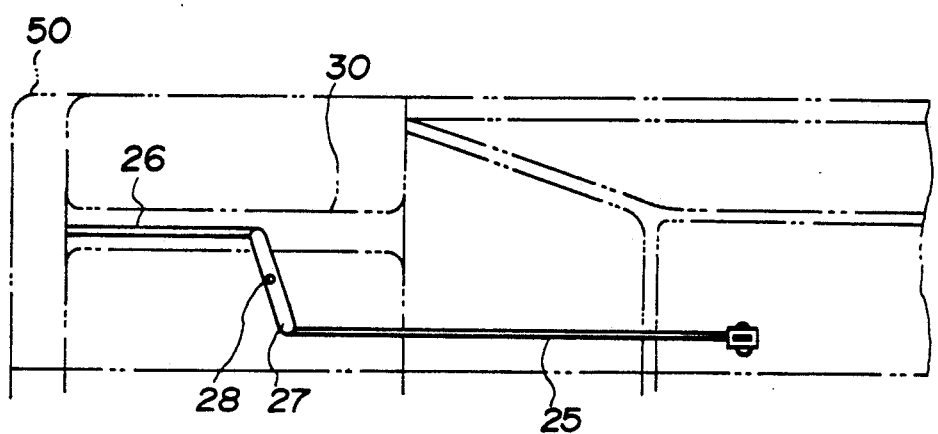
FIG. 8 is a top plan, but partial, view of the motor vehicle on which the second embodiment is mounted.

As is seen from FIG. 7, the wire 25 from the roller member 24 leads to one end of the pivotal link 27 which is pivotally connected through the pivot pin to a front side member 30 of the vehicle. The other end of the pivotal link 27 is pivotally connected to one end of the push bar 26. The push bar 26 has a front end which abuts against a back face of a front bumper 50 of the vehicle.

In the following, operation of the seat belt system of the second embodiment will be described with reference to FIGS. 5 and 9.

Figure 9:
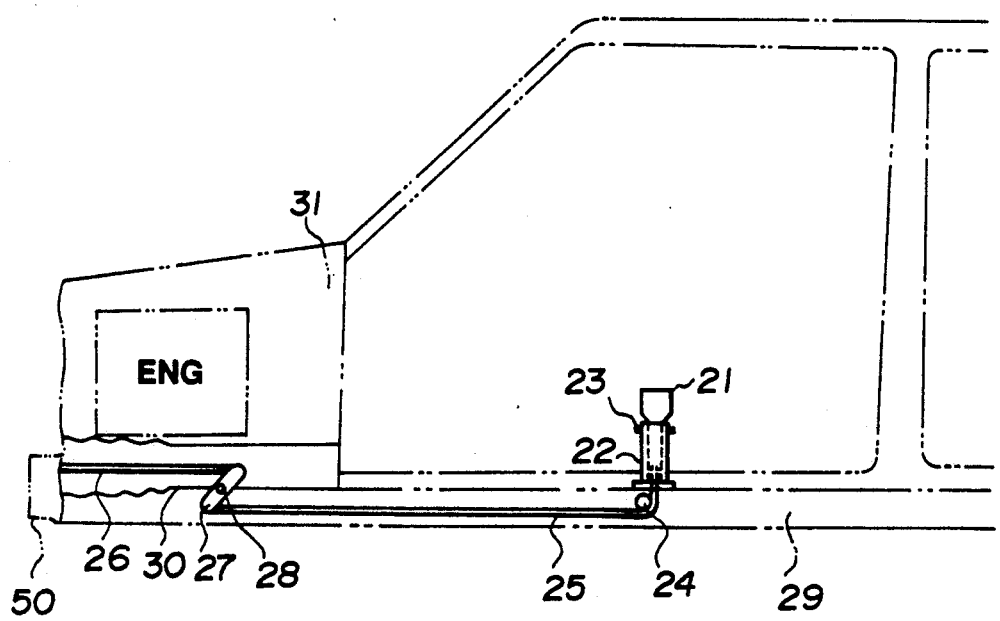
FIG. 9 is a view similar to FIG. 7, but showing a condition wherein the vehicle encounters a head-on collision.
Figure 11:
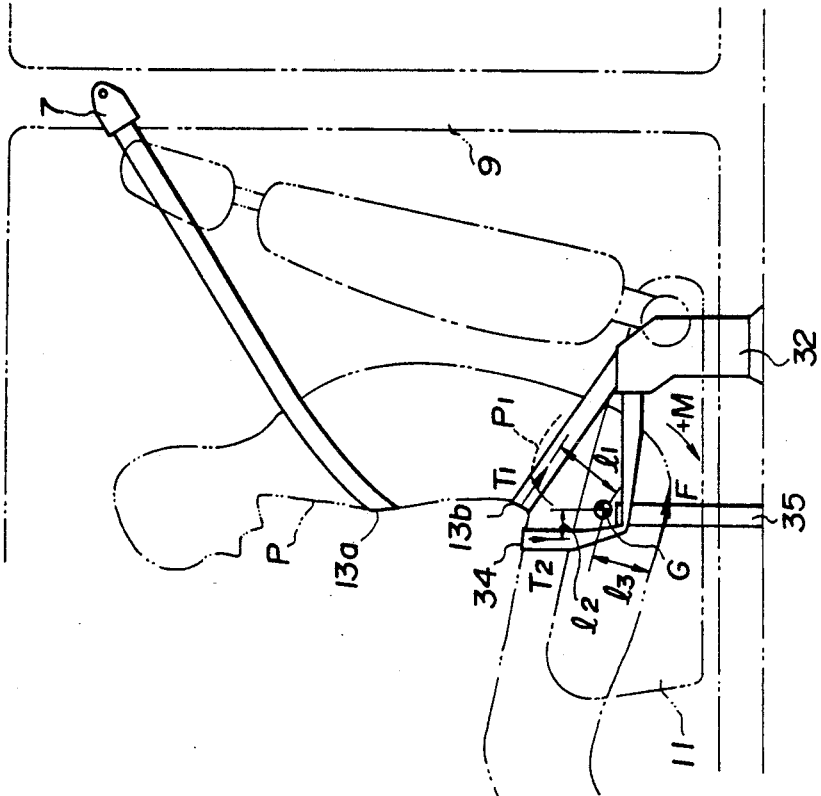
FIG. 11 is a left side view of the conventional seat belt system in a condition wherein a head-on vehicle collision occurs.
Figure 10:
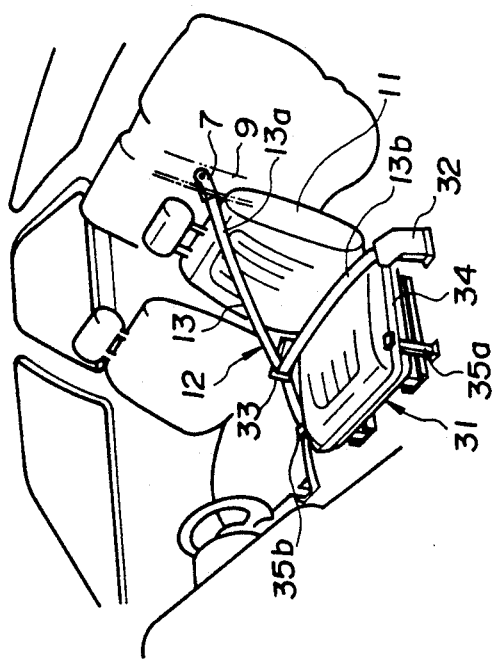
FIG. 10 is a perspective view of a conventional seat belt system applied to a front seat of a motor vehicle.

Upon a vehicle collision, the lap belt-shoulder combination belt system 12 operates in a conventional manner, as will be easily understood from FIG. 5, and at the same time, as is seen from FIG. 9, due to deformation of the front bumper 50, the push bar 26 is moved rearward causing the pivotal link 27 to pivot in a clockwise direction in FIG. 9. Thus, the wire 25 pulls the buckle member 21 downward breaking the stopper pin 23 and locking the retractor 19. Thus, the thigh belt 18 is pressed against the thigh portion of the seat occupant "P" upon the vehicle collision.

Because the operation of the thigh belt system 17 is carried out by the deformation of the front bumper 50, the fastening of the thigh belt 18 is achieved before the application of tension to the lap belt part 13b. Thus, the undesired clockwise rotation of the hip portion of the seat occupant "P" is assuredly suppressed.

What is claimed is:

1. A seat belt system for use with a seat in a motor vehicle, said seat including a seat cushion and a seatback, said system comprising:
   a combination belt including a lap belt part and a shoulder belt part, said lap belt part and said shoulder belt part restraining the lap and shoulder portions of a seat occupant to said seat cushion and seatback when in use;
   first means for increasing upon a level of deceleration of the vehicle which is greater than a given value, tension applied to said lap belt part thereby increasing the restraining force of said lap belt part;
   a thigh belt positioned in front of said lap belt part with respect to said seat cushion, said thigh belt restraining the thigh portion of the seat occupant to a major seating portion of said seat cushion when in use; and
   second means for increasing, upon said level of deceleration of the vehicle, tension applied to said thigh belt part thereby to increase the restraining force of said thigh belt part with which the thigh portion of the seat occupant is pressed against the major seating portion of said seat cushion.

2. A seat belt system as claimed in claim 1 wherein the given condition takes place when said vehicle encounters a head-on collision.

3. A seat belt system as claimed in claim 2, in which said first means comprises:
   an emergency locking type belt retractor connected to a lower portion of a body of the vehicle, said retractor having one end portion of said combination belt retracted; and
   a through ring through which said combination belt passes, said through ring being pivotally connected to an upper portion of the vehicle body.

4. A seat belt system for use with a seat in a motor vehicle, comprising:
   a combination belt including a lap belt part and a shoulder belt part which restrain respectively the lap and shoulder portions of a seat occupant when in use;
   a thigh belt positioned in front of said lap belt part with respect to said seat, said thigh belt restraining the thigh portion of the seat occupant when in use;
   an emergency locking type belt retractor connected to a lower portion of a body of said motor vehicle, said retractor having an upper end portion of said combination belt partially retracted;
   a through ring through which said combination belt passes, said through ring being pivotally connected to an upper portion of the vehicle body;
   a first anchor plate pivotally connected to one side portion of the seat, said first anchor plate having a slot for having said combination belt slidably passed therethrough;
   a second anchor plate pivotally connected to the other side portion of the seat, said second anchor plate having a slot for having the combination belt slidably passed therethrough; and
   means for applying, when said motor vehicle decelerates greater than a given amount, said thigh belt with a certain tension thereby increasing the restraining force of said thigh belt.

5. A seat belt system as claimed in claim 4, in which said second means comprises:
   an end of said thigh belt, said end being integral with a leading end of said combination belt, so that said thigh belt and said combination belt constitute a single belt; d
   a roller member mounted on a lower portion of the vehicle body, said roller member having said single belt put therearound;
   an arm portion defined by said first anchor plate, said arm portion having a leading end of said single belt fixed thereto; and
   another arm portion defined by said second anchor plate, said another arm portion having a slot for having the single belt passed therethrough.

6. A seat belt system as claimed in claim 5, in which the pivotal connection between said first anchor plate and said seat is achieved by:
   a buckle member pivotally connected to the seat; and
   a tongue portion defined by said first anchor plate, said tongue portion being latchingly engageable with said buckle member.

7. A seat belt system for use with a seat in a motor vehicle, comprising:
   a combination belt including a lap belt part and a shoulder belt part which restrain respectively the lap and shoulder portions of a seat occupant when in use;
   a thigh belt positioned in front of said lap belt part with respect to said seat, said thigh belt restraining the thigh portion of the seat occupant when in use;
   an emergency locking type belt retractor connected to a lower portion of a body of said motor vehicle, said retractor having an upper end portion of said combination belt partially retracted;
   a through ring through which said combination belt passes, said through ring being pivotally connected to an upper portion of the vehicle body;
   a buckle member pivotally connected to the lower portion of the vehicle body;

a second through ring having said combination belt passed therethrough, said second through ring having a tongue portion which is latchingly engageable with said buckle member; and another through ring pivotally connected to the lower portion of said vehicle body, said another through ring having a leading end of the combination belt fixed thereto.

8. A seat belt system as claimed in claim 7, in which said second means comprises:

an emergency locking type belt retractor mounted on the lower portion of the vehicle body, said retractor having one end portion of said thigh belt retracted;

a tongue member having the other end of said thigh belt fixed thereto;

a buckle member with which said tongue member is latchingly engageable; and a mechanism for pulling said buckle member in a direction to increase the fastening force of said thigh belt when said head-on collision occurs.

9. A seat belt system as claimed in claim 8, in which said mechanism comprises:

an elongate portion defined by said buckle member;

a support member mounted on the lower portion of the vehicle body, said support member having said elongate portion of the buckle member slidably held thereon;

a stopper pin engaged with both of said elongate portion and said support member to suppress relative displacement therebetween;

a wire having one end fixed to said elongate portion;

a roller member positioned below said support member, said roller member having said wire put therearound;

a pivotal link pivotally connected to the vehicle body, said pivotal link having first and second arm portions, said first arm portion being connected to the other end of said wire; and a push rod having one end pivotally connected to said second arm portion of said pivotal link and the other end which abuts against a back face of a front bumper of the vehicle.

10. A seat belt system for use with a seat in a motor vehicle, comprising:

an emergency locking type belt retractor mounted on a lower portion of the vehicle body;

a shoulder anchor plate pivotally connected to an upper portion of the vehicle body, said plate having a slot formed therethrough;

a first anchor plate including first and second arm portions each having a slot formed therethrough, said first anchor plate having a tongue porton;

a buckle member pivotally connected to one side portion of the seat, said buckle member being capable of catching said tongue portion;

a second anchor plate pivotally connected to the other side portion of the seat and including first and second arm portions each having a slot formed therethrough; and a roller member mounted on the lower portion of the vehicle body near said second anchor plate; and a single belt having one end portion retracted by said retractor, the belt extending from said retractor being threaded through the slot of said shoulder anchor plate, the slot of the first arm portion of the first anchor plate, the slot of the first arm portion of the second anchor plate, said roller member, the slot of the second arm portion of said second anchor plate and finally tied to the second arm portion of said first anchor plate.

11. A seat belt system for use with a seat in a motor vehicle, comprising:

an emergency locking type belt retractor mounted on a lower portion of the vehicle body;

a shoulder anchor plate pivotally connected to an upper portion of the vehicle body, said plate having a slot formed therethrough;

a first buckle member pivotally connected to a lower portion of the vehicle body;

a first tongue member latchingly engageable with said buckle member, said tongue member having a slot formed therethrough;

a terminal anchor plate pivotally connected to a lower portion of said vehicle body at a position opposite to the position where the buckle member is located;

a lap-shoulder combination belt having one end portion retracted by said retractor, said belt extending from said retractor being threaded through the slot of said sholder anchor plate, the slot of the tongue member and finally fixed to said terminal anchor plate;

a thigh belt;

an emergency locking type belt retractor mounted on a lower portion of the vehicle body, said retractor having one end portion of said thigh belt retracted;

a second tongue member having the other end of said thigh belt fixed thereto;

a second buckle member with which said second tongue member is latchingly engageable;

an elongate portion defined by said second buckle member;

a support member mounted on a lower portion of the vehicle body, said support member having said elongate portion of the second buckle member slidably held thereon;

a stopper pin engaged with both of said elongate portion of said support member to suppress relative displacement therebetween;

a wire having one end fixed to said elongate portion;

a roller member positioned below said support member, said roller member having said wire put therearound;

a pivotal link pivotally connected to the vehicle body, said pivotal link having first and second arm portions, said first arm portion being connected to the other end of said wire; and a push rod having one end pivotally connected to said second arm portion of said pivotal link and the other end which abuts against a back face of a front bumper of the vehicle.

12. A seat belt system for use with a seat in a motor vehicle, comprising:

a combination belt including a lap belt part and a shoulder belt part which restrain respectively the lap and shoulder portions of a seat occupant when in use;

a thigh belt positioned in front of said lap belt part with respect to said seat, said thigh belt restraining the thigh portion of the seat occupant when in use;

an emergency locking type belt retractor connected to a body of said motor vehicle, said retractor having an upper portion of said combination belt partially retracted;

a first anchor plate pivotally connected to one side portion of the seat, said first anchor plate having a slot for having said combination belt slidably passed therethrough;

a second anchor plate pivotally connected to the other side portion of the seat, said second anchor plate having a slot for having the combination belt slidably passed therethrough; and means for applying, upon a given condition of deceleration of the vehicle, said thigh belt with a certain tension thereby increasing the restraining force of said thigh belt.

13. A seat belt system for use with a seat in a motor vehicle, comprising:

a combination belt including a lap belt part and a shoulder belt part which restrain respectively the lap and shoulder portions of a seat occupant when in use;

a thigh belt positioned in front of said lap belt part with respect to said seat, said thigh belt restraining the thigh portion of the seat occupant when in use;

a first emergency locking type belt retractor connected to a body of said motor vehicle, said retractor having an upper portion of said combination belt partially retracted;

a second emergency locking type belt retractor mounted on a lower portion of the vehicle body, said retractor having one end of said thigh belt partially retracted; and a mechanism which, upon a given condition of deceleration of the vehicle, pulls another end of said thigh belt in a direction to increase the restraining force of the thigh belt.

* * * * *